United States Patent [19]

Warrick et al.

[11] 4,166,386
[45] Sep. 4, 1979

[54] WHEEL AND DISC CONTINUOUS INTEGRATOR

[75] Inventors: Edward C. Warrick, Pittsburgh; Michael Davis, White Oak, both of Pa.

[73] Assignee: Rockwell International Corporation, Pittsburgh, Pa.

[21] Appl. No.: 861,595

[22] Filed: Dec. 19, 1977

Related U.S. Application Data

[63] Continuation of Ser. No. 739,436, Nov. 8, 1976, abandoned.

[51] Int. Cl.$^2$ .............................................. G01F 15/02
[52] U.S. Cl. .................................... 73/194 R; 73/233
[58] Field of Search ................. 73/233, 206, 194 R; 74/191, 194, 214; 235/92 NT, 61 C

[56] References Cited

U.S. PATENT DOCUMENTS

| | | | |
|---|---|---|---|
| 3,073,157 | 1/1963 | Gehre | 73/233 |
| 3,538,766 | 11/1970 | Kugler | 73/233 X |
| 3,548,673 | 12/1970 | Suchocki | 74/214 X |
| 3,773,316 | 11/1973 | Stemmle | 74/214 X |
| 3,895,532 | 7/1975 | Blakeslee | 73/233 |

FOREIGN PATENT DOCUMENTS 1277185 6/1972 United Kingdom ................. 74/214

Primary Examiner—James J. Gill

[57] ABSTRACT

A variable ratio drive transmission driven by a fluid meter has means to vary the output to a counter in accordance with variations in both the pressure and temperature of the fluid and is comprised of a rotatable disc the drive surface of which is in drive engagement with two wheel members, both of which are mounted for adjustment radially of the axis of rotation of the disc member. The drive surface of the disc is in a plane normal to its axis of rotation and is comprised of an elastomer having a high degree of recovery and a high degree of resistance to abrasion. The drive from the meter is through one of the wheel members the radial position of which is adjusted in accordance with variations in the temperature of the fluid being metered. The radial position of the other wheel member is adjusted in accordance with variations in the pressure of the fluid being metered and is drive connected to an output counter to indicate total volume of fluid flow through the meter corrected for both pressure and temperature.

3 Claims, 8 Drawing Figures

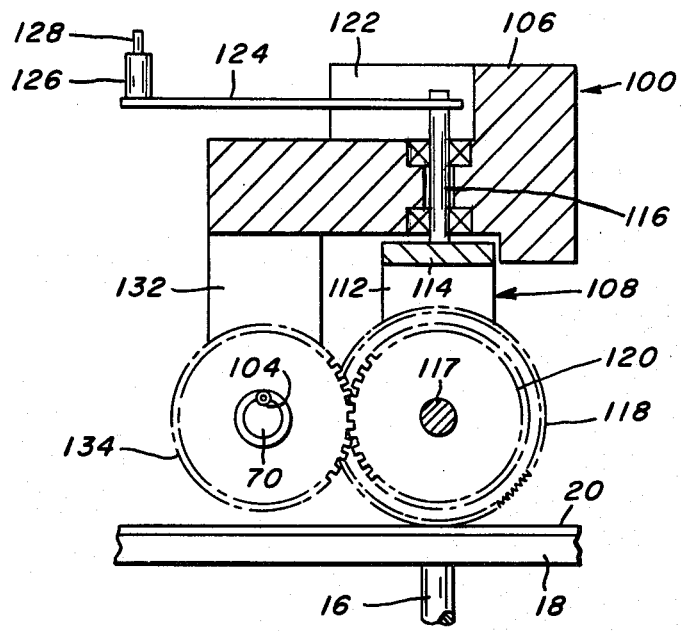
FIG. 4.
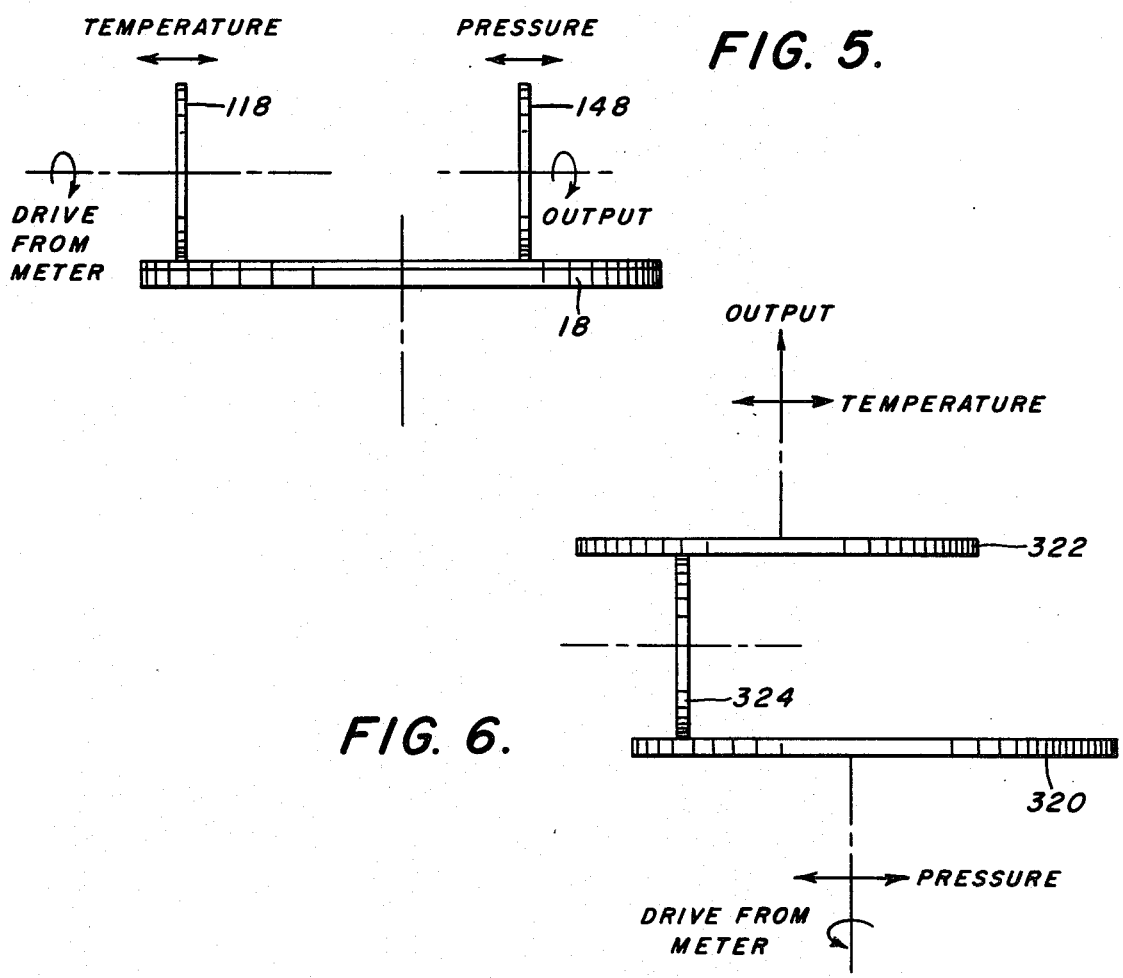
FIG. 5.
FIG. 6.

WHEEL AND DISC CONTINUOUS INTEGRATOR

This is a continuation of application Ser. No. 739,436, filed Nov. 8, 1976, now abandoned.

BACKGROUND OF THE INVENTION

This invention relates to means to compensate the output from a fluid meter (not disclosed herein) in a pipeline for variations in pressure and temperature of the fluid being metered. When it is not desired to compensate the output of the meter for pressure and temperature variations, the output from the meter is connected directly to a counter, register or other readout device. However, since variations in the pressure and temperature affect the energy content of the fluid it is often desirable to compensate the readout from the meter to reflect such variations in pressure and temperature. This is usually done by providing a variable ratio drive transmission between the meter and the readout counter with means to vary the output of the variable ratio transmission in accordance with both pressure and temperature variations. Such devices are known in the art as integrators and typical of the prior art are the integrators shown in the U.S. Patent to Kugler U.S. Pat. No. 3,538,766 and the U.S. Patent to Blakeslee et al U.S. Pat. No. 3,895,531, the presure invention being an improvement to the devices shown in these U.S. patents. The integrators shown therein employ ring members to transfer the drive between cylindrical drive elements and cone elements in the Blakeslee et al patent and from cylindrical elements to a disc element in the Kugler patent. In order to prevent slippage between the ring members and the other elements of the drive it is necessary that the radial coupling force between the ring elements and the other elements be relatively high which leads to comparatively low drive efficiency, excessive wear and reduced accuracy after extended periods of use. Also such prior art integrators require frequent maintenance and are relatively difficult to calibrate.

Integrators such as those described herein are used in fluid metering applications primarily gas metering, and provide a totallized readout of the volume of fluid which passes at varying flow rates through a meter over a given period of time. The American Gas Association specification B-109 requires that integrators for such applications perform with a minimum accuracy of ±99.25% over a full range of pressures and temperature which the integrators are required to operate. It is therefore extremely important that the variable speed drives employed in such integrators have extremely high transmission efficiencies over their full operating range for extended periods of time and not be affected by changes in environment. Thus the engagement between the driving and driven members of such drives must be such that the force biasing the members together be held to a minimum while allowing virtually no slip between the members over the entire range of speeds, and speed change ratios which the integrator is designed to operate. This accuracy and transmission efficiency must not be subject to deterioration over extended periods of time and thus the operative members must not be subject to significant wear and must be made of materials which are chemically stable.

SUMMARY OF THE INVENTION

The present invention eliminates these disadvantages by eliminating the ring elements used in such prior art to transfer the drive between the various elements. It has been found that by providing wheel-like elements having serrations or projections on their drive surface and by forming the drive surface of the variable drive radius element with an elastomeric material such as polyester type urethane, referred to as polyurethane, which has the characteristics of a high degree of recovery, the proper degree of hardness and high resistance to abrasion, a positive efficient wear resistant drive is achieved while eliminating the rings and cylinders of the prior art. Prior art drives such as that shown in the U.S. Patent to Joslin U.S. Pat. No. 1,251,784 while employing a toothed wheel in engagement with a rubber surface on a disc of a wheel and disc type drive would not respond to the exacting requirements of the applications for which the integrator described herein is designed. At any degree of hardness which would produce the required positive engagement between the driving members rubber does not exhibit the requisite degree of resistance to wear and abrasion over extended periods of time. Also the physical characteristics of most rubber formulations change over extended periods of time.

As used herein the term "variable drive radius" refers to a rotatable element of a variable ratio transmission from which the drive from the element may be taken, or to which the drive to the element may be applied, at preselected points each having a different radius from the axis of rotation of the element. Accordingly, it is an object of the present invention to provide a continuous integrator which remains accurate over extended periods of use, provides an improved torque transmission capability and is relatively free from maintenance, and easy to calibrate.

It is another object of the invention to provide an integrator in which the variable drive radius element has a drive surface comprised of an elastomer characterized by high recovery and high resistance to abrasion.

It is a further object of the invention to provide a wheel and disc integrator in which the drive surface of the variable drive radius element is formed of polyurethane, the other drive elements being wheels having serrations in drive contact with the polyurethane surface of the disc.

Other objects of the invention will appear as the description hereinafter proceeds.

DESCRIPTION OF THE DRAWINGS

FIG. 4 is a sectional view in elevation taken along line 4—4 of FIG. 2 in the direction of the arrows.

FIG. 5 is a schematic diagram of the variable ratio drive of the integrator shown in FIGS. 1-4.

FIGS. 6, 7 and 8 are schematic diagrams of the drive elements of alternative forms of variable ratio transmissions with which the instant invention may be used.

DESCRIPTION OF THE INVENTION

Figure 1:
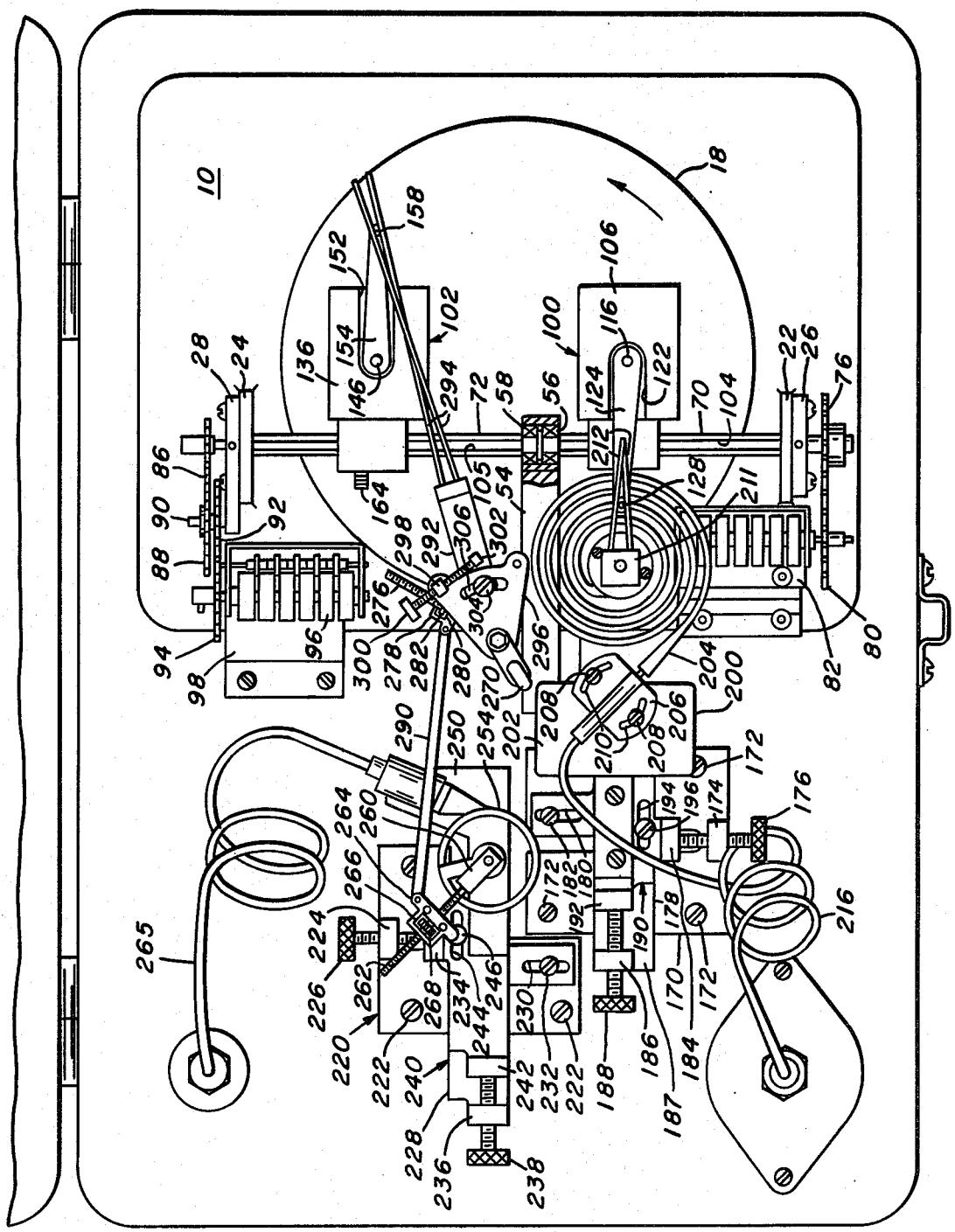
FIG. 1 is a top plan view of an integrator embodying the invention hereof.

Referring to the drawings a base indicated generally by a numeral 10 is supported by a generally hollow pedestal 12. A bearing cartridge 14, supported in the base supports shaft 16 and disc 18 for rotation about the axis of the shaft 16. The top surface 20 of the disc is comprised of a layer of elastomeric material characterized by certain important qualities to be hereinafter more fully described including the ability to return to its original condition after deformation, and resistance to abrasion and wear.

Figure 2:
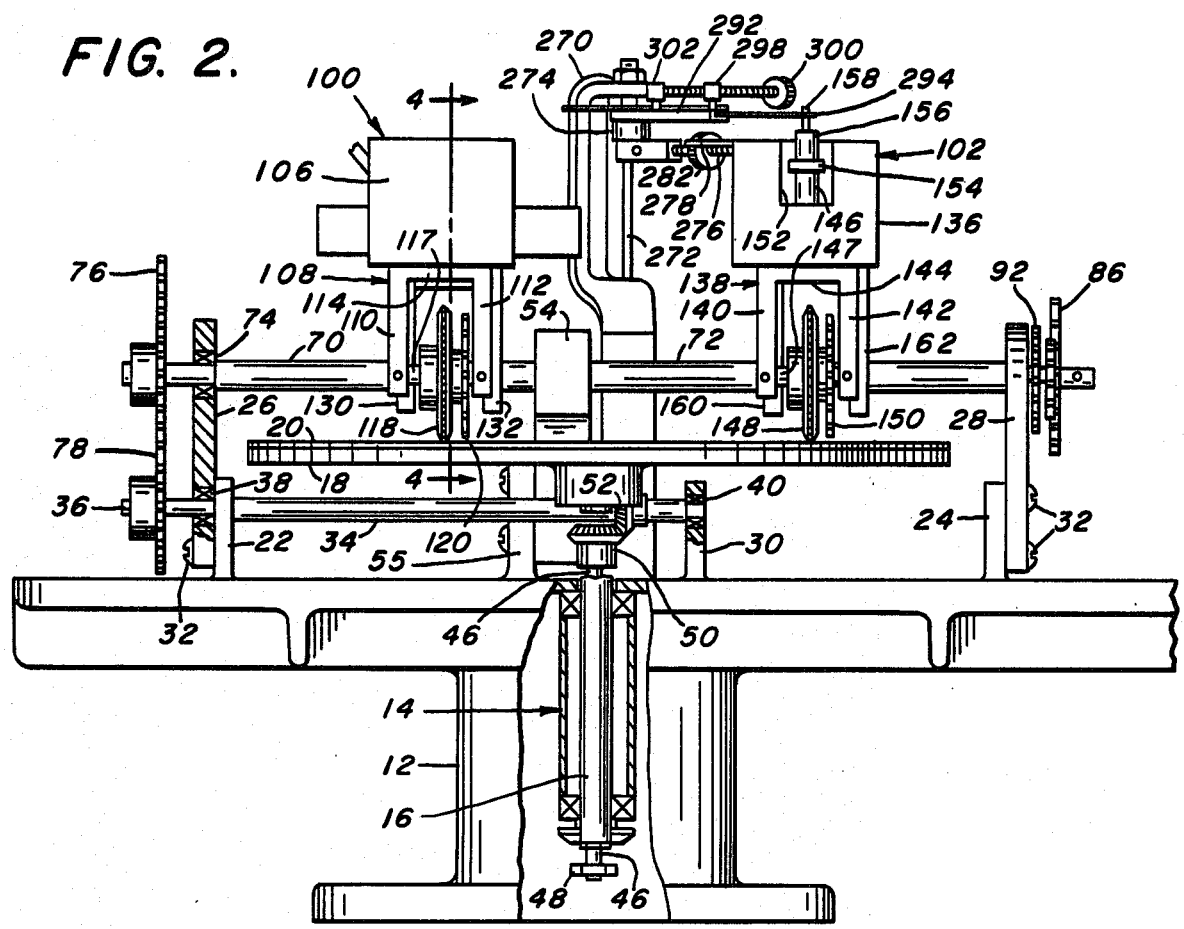
FIG. 2 is a front end elevation of the device shown in FIG. 1 partially in section with certain elements shown in FIG. 1 being eliminated.
Figure 3:
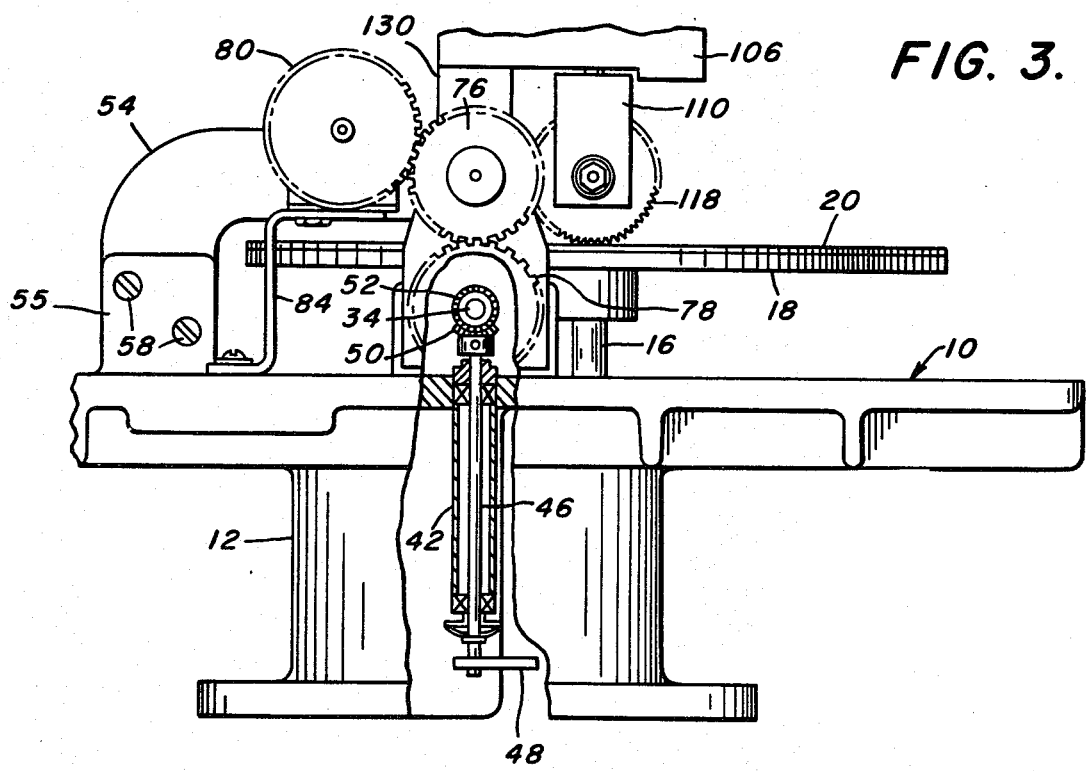
FIG. 3 is a view partly in section, taken from the left side of the apparatus shown in FIG. 1 with certain elements eliminated.

Two vertical bosses 22 and 24 are formed integrally on and project upwardly from either side of the top surface of base 10 as viewed in FIGS. 1 and 2. A generally centrally located bearing support 30 is formed integrally on and projects upwardly from the base 10 also. Bearing plates 26 and 28 are secured on bosses 22 and 24 respectively, by means of screws 32, only one of which is shown on bearing plate 26. Horizontally disposed shaft 34 has a reduced portion 26 at its left end as viewed in FIG. 2, which passes through boss 22 and is rotatably received in bearing 38 in bearing plate 26. The right end of shaft 34 is rotatably received in bearing 40 supported in boss 30. To the rear of shaft 16 as shown in FIG. 3 a meter driven shaft 46 is rotatably received in bearing cartridge 42 which is press fitted or otherwise secured in an opening in the base 10 and depends therefrom within pedestal 12. The lower end of shaft 46 has a drive dog 48 which is adapted to be driven by a mating element driven by the drive from a meter in the fluid line, the volume of fluid flow through which is to be measured. The upper end of shaft 46 has secured thereto a bevel gear 50 which meshes with a mating bevel gear 52 secured to shaft 34 beneath the disc 18. Thus the meter drives shaft 46 which through bevel gears 50 and 52 drives shaft 34.

A generally centrally located cantilevered bearing support 54 has one end secured by means of screws 58 to boss 55 integrally formed on and extending upwardly from base 10 (FIG. 3). The cantilevered arm of support 54 extends upwardly and over disc 18. The free end of the support, which is shown in section in FIG. 1, contains bearings 56 and 58. As best shown in FIGS. 1 and 2 adjacent ends of separate shafts 70 and 72 are journalled respectively in bearings 56 and 58 retained in the cantilevered end of support 54. The opposite ends of shafts 70 and 72 have reduced portions which are journalled respectively in the upper part of bearing supports 26 and 28 by means of suitable bearings such as bearing 74 in support 26. The reduced portion of shaft 70 extends through the bearing 74 and has secured to the end thereof a gear 76 which meshes with gear 78 secured to the free end of reduced portion 36 of shaft 34. Gear 76 also meshes with and drives gear 80 (FIG. 3) which is the input gear of a digital counter 82 securely mounted on a support bracket 84 secured to and projecting upwardly from base 10. The reduced portion of shaft 72 extending from the right end thereof as viewed in FIG. 2 is supported in bearing support 28 by means of a bearing (not shown) and projects through bearing support 28. Secured to the extreme right hand end of shaft 72 as viewed in FIGS. 1 and 2 is a gear 86 which meshes with gear 88 rotatably mounted on a stub shaft 90 projecting from the bearing support 28. Gear 92 is also mounted for rotation with gear 88 on stub shaft 90 and meshes with and drives gear 94 of a digital counter 96 also supported on bracket 98 secured to and extending upwardly from the base 10.

Two sliding wheel head assemblies 100 and 102 are mounted respectively on shafts 70 and 72 for sliding axial movement along shaft 70 and 72 and radially of the axis of rotation of disc 18. FIG. 4 shows a vertical cross section of head 100 taken along the lines 4—4 of FIG. 2 and to which reference will now be had. Head 100 is comprised of a body member 106 and pivoted steering member 108 which in turn is comprised of a U-shaped wheel mount having two depending legs 110 and 112 (FIG. 2) projecting downwardly from horizontal bridging portion 114. A shaft 116 projects upwardly from bridging portion 114 and is rotatably received in a vertical bore formed in the body 106 to rotatably mount steering member 108 in body 106. Wheel 118 (shown in dotted lines in FIG. 4) and gear 120 are mounted for rotation together with shaft 117 which extends between and is rotatably received in depending legs 110 and 112 in a manner to prevent any significant lateral movement between wheel 118, gear 120 and depending arms 110 and 112. The upper end of shaft 116 projects above the floor of a groove 122 formed in the top of body 106, and one end of an arm 124 is secured to the upper end of shaft 116 within groove 122. The other end of arm 124 carries an upstanding bearing post 126 the upper end of which is reduced to form a pin 128. Thus as the arm 124 is rotated about the axis of shaft 116 the entire wheel member 108 is similarly rotated about the axis of shaft 116 to turn wheel 118 and gear 120 in accordance with the rotary movement of arm 124.

Spaced vertical legs 130 and 132 extend from the bottom portion of the left side of body 106 as viewed in FIG. 4. Shaft 70 is also journalled and is slidably received in legs 130 and 132 and within the confines of depending legs 130 and 132, the gear 134 is keyed to shaft 70 by means of groove 104 and a mating key formed on gear 134 so that gear 134 and shaft rotate together while permitting free translatory movement of the gear 134 along the axis of shaft 70. The gear 134 is confined between the legs 130 and 132 to prevent any relative lateral movement between the legs and the gear while permitting rotary motion of the gear. Teeth formed on a periphery of gear 120 loosely mesh with teeth formed on the periphery of gear 134 so that limited angular displacement of the gear 120 about the axis of shaft 116 is permitted while maintaining drive engagement between gear 120 and gear 134. The periphery of wheel 118 is relatively narrow and is formed with serrations, knurled or otherwise formed with small uniform projections to produce a strong drive engagement between the wheel 118 and the surface 20 of disc 18. The entire wheel head assembly 100 is supported on shaft 70 and on disc 18 through wheel 118. The weight of the wheel head assembly 100 therefore presses the serrations in the periphery of wheel 118 into the polyurethane surface 20. As the wheel 118 rotates about its axis because of the elastomeric nature of surface 20, the serrations on the periphery of the wheel form discrete deformations in the surface 20 into which deformations the wheel serrations project. Thus, the serrations or teeth on the wheel form mating serrations or teeth in the surface 20 to produce a drive engagement between the wheel 118 and disc 18 similar to the engagement between two gears whereby any slippage or relative movement between wheel 118 and the disc 18 is virtually eliminated. It has been found that substantial torque loads may be transmitted by this drive without slippage.

As used herein the term "serrations" will refer to a periphery of a wheel drive element which has been formed with serrations, knurled or otherwise formed with uniform projections which form discrete deformations in the drive surface of the drive element thereby forming mating projections in said drive surface to produce a drive engagement between the two elements which substantially eliminates slippage between the two elements under normal operating torque loads.

As the shaft 70 is caused to be rotated the gear 134 rotates therewith and drives gear 120 and wheel 118 which in turn drives disc 18 and causes it to rotate about the axis of shaft 16. If, while this system is in motion, the arm 124 is angularly displaced about the axis of shaft 116 in a counterclockwise direction from the position shown in FIG. 1, the steering member 108 together with wheel 118 and gear 120 will also be angularly displaced. If disc 18 is being driven in a counter-clockwise direction as viewed in FIG. 1, a radial thrust on the wheel head 100 will be produced in a direction radially outward of the disc 18, and since the gear 134 is keyed to shaft 70 to permit axial movement relative thereto and since shaft 70 is journalled for relative axial sliding movement in depending legs 130 and 132, the entire wheel head assembly 100 will move radially outward on disc 18 as viewed in FIG. 1 until arm 124 is again centered to the position shown in FIG. 1. Conversely if the arm 124 is angularly displaced in a clockwise direction as shown in FIG. 1, the head 100 will move radially inward of disc 18 until the arm 124 is again returned to the centered position with respect to the head 100 as shown in FIG. 1. Since the periphery of wheel 118 is relatively narrow its contact with surface 20 approaches a point contact which facilitates turning or steering of the wheel about the axis of shaft 116. An excessive area of contact between wheel 118 and surface 20 would unduly increase the effort necessary to turn the wheel.

Wheel head 102 is very similar to wheel head 100 and operates in a similar manner. As best shown in FIGS. 1 and 2, head 102 is comprised of a body member 136 and a pivoted steering member 138 which in turn is comprised of a U-shaped wheel mount having two depending legs 140 and 142 projecting downwardly from horizontal bridging portion 144. A shaft 146 projects upwardly from bridging portion 114 and is rotatably received in a vertical bore formed in body 136 to rotatably mount steering member 138 in the body 136. Wheel 148 and gear 150 are mounted for rotation together with shaft 147 which extends between and is rotatably received within depending legs 140 and 142 in a manner to prevent any significant lateral movement between wheel 148, gear 150 and depending arms 140 and 142. The upper end of shaft 146 projects above the floor of groove 152 formed in the top of body 136 which groove extends to the front end of body 136 as viewed in FIG. 2. One end of arm 154 is secured to the upper end of shaft 146 within groove 152, the other end of arm 154 carrying an upstanding bearing post 156 the upper portion of which is reduced to form pin 158. Thus as the arm 154 is displaced angularly about the axis of shaft 146 from the position shown in FIG. 1 the entire wheel member 138 is similarly rotated about the axis of shaft 146 to turn wheel 148 and gear 150 in accordance with the angular displacement of arm 154.

Spaced vertical legs 160 and 162 which are comparable to legs 131, 132 of body 106, extend from the bottom rear portion of body 136. Shaft 72 is also journalled and is slidably received in legs 160 and 162 and within the confines of depending legs 160 and 162 the gear 164 (FIG. 1) is keyed to shaft 72 by means of a groove 105 and a mating key portion formed in gear 164 so that gear 164 and shaft 72 rotate together while permitting free translatory movement of gear 164 and head 102 along the axis of shaft 72 all in the manner substantially identical to that described with respect to corresponding parts of wheel head 100. Teeth formed on the periphery of gear 150 loosely mesh with teeth formed on the periphery of gear 164 so that limited angular displacement of the gear 150 about the axis of shaft 146 is permitted while maintaining drive engagement between the gear 150 and gear 164. As in the case of wheel 118 the periphery of wheel 148 is relatively narrow and has serrations or is knurled or otherwise formed with small uniform projections to produce a strong drive engagement between wheel 148 and the surface 20 of disc 18 in the same manner as explained with respect to wheel 118. However, in the case of wheel head 100 the wheel 118 drives disc 18. In the case of wheel head 102 the disc 18 drives the wheel 148 and gear 150 which drives gear 164 which in turn drives shaft 72. The wheel head 102 is free for translatory movement along shaft 72 in the same manner as head 100 is free for movement along shaft 70 as explained above.

With particular reference to FIG. 1 a mounting plate 170 is secured to base 100 by any convenient means such as screws 172. Boss 174 integrally formed on plate 170 and extending upwardly therefrom has adjusting screw 176 threaded therethrough. Lateral adjustment plate 178 is mounted on plate 170 for lateral movement relative thereto. In the following description of the position adjusting means for the temperature and pressure sensing elements the term "lateral" will refer to a direction of movement from right to left or reverse, in FIG. 1. The term "longitudinal" will refer to a direction of movement from top to bottom or reverse in FIG. 1 which is from front to rear of the integrator since FIG. 2 is a front elevation. A screw 182 projects through an elongated opening 180 in plate 178 and is threaded into plate 170 for securing plate 178 in any laterally adjusted position. Integrally formed on and projecting upwardly from plate 178 is an abutment 184 into which the end of adjustment screw 176 is rotatably received but which is retained against lateral movement with respect thereto. Thus by threading adjustment screw 176 in either direction in boss 174 the lateral position of plate 178 may be adjusted. Integrally formed on and projecting upwardly from plate 187 is boss 186 through which longitudinal adjustment screw 188 is threaded. Longitudinal adjustment plate 190 is mounted on plate 178 for longitudinal movement with respect thereto. Integrally formed on and projecting upwardly from plate 190 is abutment 192 into which the end of adjustment screw 188 is rotatably received but which is retained against relative longitudinal motion with respect thereto. A screw 196 projects through elongated opening 194 in plate 190 and is threaded into plate 178 for securing plate 190 in its longitudinally adjusted position. Thus by threading adjustment screw 188 in either direction in boss 186 the longitudinal position plate 190 may be adjusted and then secured in its adjusted position by screw 196.

Projecting upwardly from adjustment plate 190 and secured thereto by any convenient means not shown is a mounting bracket 200 which has a horizontally disposed mounting portion 202. The outer end of temperature coil 204 is secured on portion 202 by means of a mounting bracket 206 which is secured to portion 202 for rotary adjustment relative thereto by means of screws 208 which project through arcuate slots 210 and are threaded into portion 202. The outer end of the temperature coil 204 is thereby rigidly supported on portion 202 for lateral and longitudinal movement therewith leaving the inner end of the coil free for rotary movement in accordance with temperature variation of the fluid being metered. By adjusting screw 176, plates 178, 190, bracket 200 and coil 204 may be moved laterally to any adjusted lateral position within the movement permitted by opening 180. By adjusting screw 188 the plate 90, bracket 200 and temperature coil 204 may be adjusted longitudinally to any desired position within the limits of slot 194. Thus the position of the temperature coil 204 may be adjusted both laterally and longitudinally.

A coupling block 211 is secured to the inner end of temperature coil 204 for rotary movement therewith. Projecting from coupling block 210 in a generally radial direction with respect to temperature coil 204, are two converging coupling rods 212 which at a point approximately midway between their extremities embrace pin 128 on arm 124. Rods 212 may be formed of metal and are therefore sufficiently rigid to move pin 128 and arm 124 with normal flexing of temperature coil 204 while the variable ratio transmission is in motion; however, because of the length of coupling arms 212 and their relative thinness they have a degree of resiliency to permit some limited flexing of coil 204 and movement of coupling block 211 with respect to arm 124 under certain conditions as will hereinafter be explained.

The interior of temperature coil 204 is connected by means of conduit 216 to the interior of a temperature sensing bulb, not shown, which is located in the pipeline carrying the fluid which is to be metered. The interior of such temperature sensing bulbs, the conduit 216 and temperature coil 204 is filled with a fluid which expands and contracts in accordance with variations in the temperature in the fluid in which the bulb is located. Thus as the temperature of the fluid in the pipeline varies, temperature coil 204 will flex and thereby rotate mounting block 211 in a clockwise or counterclockwise direction as the case may be. Such motion of the mounting block 211 through rods 212 causes the arm 124 to be angularly displaced in a counterclockwise or clockwise direction in accordance with variations in the temperature of the fluid being metered.

With particular reference to FIG. 1, a mounting plate 220 is secured to base 10 by any convenient means such as screws 222. Boss 224 integrally formed on plate 220 and extending upwardly therefrom has adjusting screw 226 threaded therethrough. Lateral adjustment plate 228 is mounted on plate 220 for lateral movement relative thereto. Integrally formed on and projecting upwardly from plate 228 is an abutment 234 into which the end of adjustment screw 226 is rotatably received but which is retained against lateral movement with respect thereto. Thus by threading adjustment screw 226 in either direction in boss 224 the lateral position of plate 228 may be adjusted. A screw 232 projects through elongated opening 230 in plate 228 and is threaded into plate 220 for securing plate 228 in any laterally adjusted position. Integrally formed on and projecting upwardly from plate 228 is boss 236 through which longitudinal adjusting screw 238 is threaded. Longitudinal adjustment plate 240 is mounted on plate 228 for longitudinal movement with respect thereto. Integrally formed on and projecting upwardly from plate 240 is abutment 242 into which the end of adjustment screw 238 is rotatably received but is retained against relative longitudinal motion with respect thereto. Thus by threading adjustment screw 238 in either direction in boss 236 the longitudinal position of plate 240 may be adjusted and then secured in its adjusted position by screw 246. A screw 246 projects through elongated opening 244 in plate 240 and is threaded into plate 228 for securing plate 240 in its longitudinally adjusted position on plate 228.

The lower end of pressure coil 254 is rigidly secured to a mounting bracket 250 which in turn is secured on plate 240 for movement therewith by any convenient means such as screws (not shown). The upper inner end of pressure coil 254 is connected to mounting block 260 from which extends a threaded arm 262. The interior of pressure coil 254 is connected through a conduit 265 to the interior of the pipeline at the point where the fluid flow is being metered. Thus the pressure coil 254 will flex in accordance with variations in pressure in the pipeline causing arm 262 to swing in a circular arc about the axis of the pressure coil 254. A pivot adaptor 264 having an opening 266 is slidably mounted for movement along the length of arm 262. An adjustment nut 268 is threaded on arm 262 and received in opening 266 whereby upon adjustment of the nut 268 along the length of arm 262 pivot adaptor 264 will be likewise adjusted along the length of arm 162.

A U-shaped pivot bracket 270 projects upwardly from base 10 as best shown in FIG. 2. Pivot shaft 272 is pivotally mounted between the upper and lower legs of bracket 270. Mounting block 274 is secured on pivot shaft 272 for rotation therewith and has projecting therefrom threaded arm 276 on which a second pivot adaptor 278 is mounted for sliding movement along the length thereof. Pivot adaptor 278 has an opening similar to opening 266 in pivot adaptor 264 into which opening is received adjusting nut 282 which is threaded onto arm 276. Thus by adjusting nut 282 along the length of arm 276 pivot adaptor 278 is likewise adjusted along the length of arm 276. As best shown in FIG. 1, one end of arm 290 is pivotally connected to pivot adaptor 264, the other end of arm 290 being pivotally connected to pivot adaptor 278.

One end of an arm 292 is mounted on pivot shaft 272 for relative pivotal motion with respect thereto. Coupling rods 294 project from the other end of arm 292 and near their end embrace pin 158 on arm 154. As in the case of rods 212, rod 294 are made of metal and are sufficiently rigid to cause movement of arm 154 with movement of arm 292 under normal operating conditions when the variable ratio transmission is in motion, but are sufficiently resilient to permit limited rotary movement of arm 292 relative to pin 158 and arm 154 under certain conditions.

Yoke 296 formed in the shape of a portion of a circular disc is mounted on pivot shaft 272 for rotation therewith. A boss 298 projects upwardly from yoke 296 through which adjusting screw 300 is threaded, the end of screw 300 being received in a boss 302 projecting upwardly from arm 292. The end of adjusting screw 300 is received in boss 302 in a manner to permit rotation of the screw 300 but prevent any axial movement of the screw 300 relative to the boss 302. Thus by threading the screw 300 into or out of boss 298 the relative angular position of the yoke 296 with respect to arm 292 may be adjusted. A screw 304 projects through an arcuate opening 306 in yoke 296 and is threaded into arm 292 for securing the arm 292 and yoke 296 in relative angular adjusted position.

As the pressure coil 254 is caused to flex by variations in the pressure in the fluid pipeline the arm 262 rotates about the axis of the pressure coil, and through the linkage of arm 290 which extends between pivot adaptors 264 and 278, mounting block 274 and pivot shaft 272 are caused to rotate about the axis of shaft 272. Since yoke member 296 rotates with pivot shaft 272 and is secured to arm 292, arm 292 is likewise rotated about the axis of pivot shaft 272 concomitantly with the rotation of arm 262. Thus, as the pressure in the pipeline causes the pressure coil 254 to flex, arm 292 rotates proportionately therewith and causes arm 154 to be angularly displaced about the axis of shaft 148 in wheel assembly 102.

Operation of the above described apparatus will now be explained. The drive from the meter in the pipeline is connected to shaft 46 (FIG. 3) by means of dog 48. Shaft 46 drives shaft 34 through bevel gears 50 and 52 (FIG. 2) and shaft 34 drives shaft 70 through gears 78 and 76. Shaft 70 drives wheel 118 through gears 134 and 120. Thus, rotation of the wheel 118 represents flow through the meter uncorrected for temperature or pressure variation. The drive from the meter to wheel 118 is such that wheel 118 drives disc 18 in a counterclockwise direction as viewed in FIG. 1. As the temperature of the fluid being metered increases, temperature coil 204 flexes in a direction to rotate mounting block 211 and rods 212 in a counterclockwise direction as viewed in FIG. 1. This causes arm 124 to be angularly displaced from the initial position shown in FIG. 1 in a counterclockwise direction about the axis of shaft 116 to position wheel 118 at an angle with respect to its initial position as shown in FIG. 2, which because of the direction of rotation of disc 18 causes the wheel head 100 to move radially outward on disc 18. This radial movement of head 100 on disc 18 is guided by shaft 70 and continues until the arm 124 and wheel 118 is returned to its initial position where the axis of rotation of wheel 118 is again radial with respect to disc 18. At this point the movement of head 100 along shaft 70 ceases but because the head is now positioned radially outward from its initial position the speed of disc 18 will be reduced in accordance with the increase in temperature in the fluid being metered. The speed of the disc 18 therefore reflects the fluid flow through the meter corrected for temperature only. In the event the temperature of the metered fluid should decrease, movement of the head 100 will take place and the position of head 100 will be adjusted radially inward of disc 18 whereby increasing the speed of disc 18 in accordance with such decrease in temperature in the fluid being metered. Thus the speed of the disc 18 is a measure of the fluid flow through the meter corrected for temperature only.

If the pressure of the fluid being metered should increase, pressure coil 254 will flex in a manner to rotate arm 262 in a counterclockwise direction as shown in FIG. 1. Such a movement will cause arm 292 and rods 294 to also rotate in a counterclockwise direction through the linkage of arm 290, pivot adaptor 278, arm 276, mounting block 274, pivot shaft 272, and yoke 296. Such motion of the rods 294 will cause arm 154 to be angularly displaced from the position shown in FIG. 1 about shaft 146 in a counterclockwise direction and will rotate wheel 148 in a counterclockwise direction. Since the drive is from disc 18 to wheel 148, and since disc 18 is rotating in a counterclockwise direction the position of head 102 will be adjusted radially outward of disc 18 and will be guided in such radial outward movement along shaft 72. The speed of wheel 148 will therefore be increased from the speed at which it was being driven in its initial position as shown in FIG. 1, in accordance with the increase in the pressure of the fluid being metered. Thus, the speed of wheel 148 represents the flow through the meter corrected for both temperature and pressure. Since shaft 72 is driven through gear 150 and gear 164 the speed of shaft 72 likewise represents the fluid flow through the meter corrected for temperature and pressure. Counter 98 driven through gears 94, 88, 92 and 86 from shaft 72 therefore provide an indication of the volume of fluid flow through the meter corrected for both pressure and temperature. As explained above, as the wheels 118 and 148 are rotated, because of the elastomeric nature of the surface 20, the serrations on the wheels form discrete deformations in the surface 20 which result in mating serrations in the surface 20 to produce a positive drive between the wheels and the disc.

The surface 20 of the disc 18 is comprised of a layer of material characterized by the quality of having a low value of compression set or a high degree of recovery, which refers to the ability of the material to return to its original condition, shape or position after deformation and to continue to do so over extended periods of time during which the material is repeatedly subjected to deformation. This quality will hereinafter be referred to as "low compression set." This material must also exhibit the proper degree of hardness and a high degree of resistance to abrasion, wear or cutting action which last mentioned quality will hereinafter be referred to as "resistance to abrasion."

Extensive experimentation and testing by applicant has established characteristics and optimum values thereof which must be displayed by the elastomeric surface 20 in order to make the drive described herein responsive to the requirements of the integrator hereof. As stated above it is important that the surface 20 have a low compression set, a high resistance to abrasion and the proper degree of hardness. It will be appreciated that the degree of hardness affects both compression set and resistance to abrasion.

The physical characteristics of materials are quantitatively determined by standard test procedures prescribed by the American Society for Testing Materials (ASTM) and other well organizations of a similar nature. These procedures give a standard basis for comparison of the physical characteristics of various materials and are widely used in material specifications to specify the desired characteristics. The specification values hereinafter set forth for the material of surface 20 are those which would be obtained by applying such standard test procedures.

After extensive testing applicant has determined that the optimum value of compression set be not significantly greater than 35% as measured by the procedure prescribed by ASTM Test D395, Method B. This means that a sample of the material tested would recover all but 35% of its deformation or deflection after application of the procedure set forth in this standard test. It was found that a lower value of compression set results in an excessively high degree of hardness which causes slippage between the drive elements and therefore reduced the drive efficiency. A higher value of compression set results in permanent deformation in the form of grooves in surface 20 which impaired the "steering"

action of the serrated wheels and therefore the efficiency of the drive.

As in the case of compression set the resistance to abrasion is related to the degree of hardness of the material. A hard material has a greater resistance to abrasion than a soft material. However an excessively hard material, as pointed out above, adversely affects the efficiency of the drive, while an excessively soft material not only produces permanent deformation of an unacceptable degree as noted above, but also results in excessive wear. Applicant's tests established that the preferred degree of resistance to abrasion was a value of not significantly greater than 55 as determined by ASTM Test C501 (Taber and H.18 wheel used). This specification requires that no more than 55 milligrams of the material be lost for each one thousand revolutions of the abrading wheel which is applied to a sample of the material in accordance with the prescribed test.

Applicant has found that the optimum degree of hardness was exhibited when the hardness value was in the range of 50 to 55 as measured on the Shore D scale using ASTM Test 676. When the hardness value was within this range it was found that the requisite degree of both compression set and resistance to abrasion was achievable.

Thus applicant has determined that the optimum characteristic of the material for surface 20 is a compression set not significantly greater than 35%, a hardness value of 50 to 55 and a resistance to abrasion of not significantly greater than 55 all as measured by the standard ASTM tests described herein. While some slight deviation from the values specified herein may take place without departing from the practice of the invention described herein, applicant believes a deviation of over 10% from the values specified will seriously affect the capability of the material to respond to the performance requirements of the integrator.

Other desirable qualities are resistance to deterioration with age, chemical stability and insensitivity to reasonable temperature changes. All of these characteristics are exhibited by some formulations of the polyester type urethane elastomers as exemplified by the thermoplastic urethanes marketed by the Mobay Chemical Company under the registered trademark "Texin" but any material exhibiting the foregoing qualities would be equally feasible from the performance standpoint.

As indicated above, the coupling rods 212 and 294 have some degree of resiliency but are sufficiently rigid to control the movements of arms 124 and 154 when the variable ratio drive is in motion under normal operation. However, if there is no flow through the meter in the pipeline the disc 18 will not be in motion. If under such conditions there is a change in the temperature or pressure of the fluid in the pipeline the temperature coil 204 or pressure coil 254 as the case may be will nevertheless flex causing mounting block 211 or arm 292 to rotate. Since the disc 18 is not in motion, heads 100 or 102 cannot move radially. Therefore under such conditions the resiliency of the rods 212 and 294 permit rotation of block 211 or arm 292 without a corresponding movement of arms 124 or 154 or corresponding radial movement of head 100 and 102.

The various linkages described above permit adjustments for pressure and temperature range, accuracy range, linearity and other operating parameters of the integrating device described herein. For example, the angularity of the linkage comprised of arm 262, arm 290 and arm 276 may be adjusted by adjustment of pivot adaptor 264. This adjustment has the effect of adjusting the range of pressure variations over which the pressure compensating mechanism will operate. The angularity between yoke member 296 and arm 292 may be adjusted by adjustment of screw 300. This adjustment has the effect of adjusting the set point or the lower limit of the pressure variation range over which the pressure compensating apparatus is to operate.

The position of the temperature coil with respect to pin 128 on arm 124 of wheel block assembly 100 and the position of the pressure coil 254 with respect to the pivot point of arm 292 may also be adjusted. Longitudinal adjustment of the temperature coil away from pin 128 increases the temperature limits within which the integrator will operate and adjustment toward the pin 128 decreases the temperature limits within which the integrator will operate within the prescribed accuracy limits. Lateral movement of the temperature coil 204 by adjustment of screw 176 has the effect of moving the accuracy versus fluid temperature curve up or down with respect to the 100% accuracy point.

Adjustment of the pressure coil 254 longitudinally toward or away from the pivot point of arm 292 adjusts the linearity of the pressure versus accuracy curve while lateral adjustment of the position of the pressure coil has an effect similar to a lateral adjustment of the temperature coil, that is, it moves the fluid pressure versus accuracy curve up or down with respect to the 100% accuracy point.

It should be understood that the invention described hereinabove is equally useful with other equivalent forms of variable ratio transmissions which provides for a variable input. FIG. 5 is a schematic drawing showing the relationship of the variable ratio transmission drive elements of the above described integrator. In that form of transmission only one element having a variable drive radius, the disc, was employed in combination with two fixed radius drive wheels. In the embodiments shown in FIGS. 5 and 6 the discs are the variable drive radius elements, while in the embodiments of FIGS. 7 and 8 the cones are the variable drive radius elements. Another form of variable ratio drive which may employ the instant invention is shown schematically in FIG. 6 which utilized two variable drive radius elements that is discs, and one fixed radius element, or wheel. In such an arrangement the drive from the meter is applied to disc 320 which drives wheel 324 which in turn drives disc 322. By adjusting the axis of rotation of the disc 320 in a direction parallel to the axis of rotation of the wheel in accordance with variations in pressure the drive ratio between the disc 320 and wheel 324 will reflect such pressure variations. By adjusting the axis of rotation of disc 322 in a direction parallel to the axis of wheel 324 in accordance with variations in the temperature of the fluid, the drive ratio between wheel 324 and disc 322 will vary in accordance with such temperature variations and the rotation of the disc 322 will therefore reflect fluid flow through the meter corrected for pressure and temperature.

Figure 7:
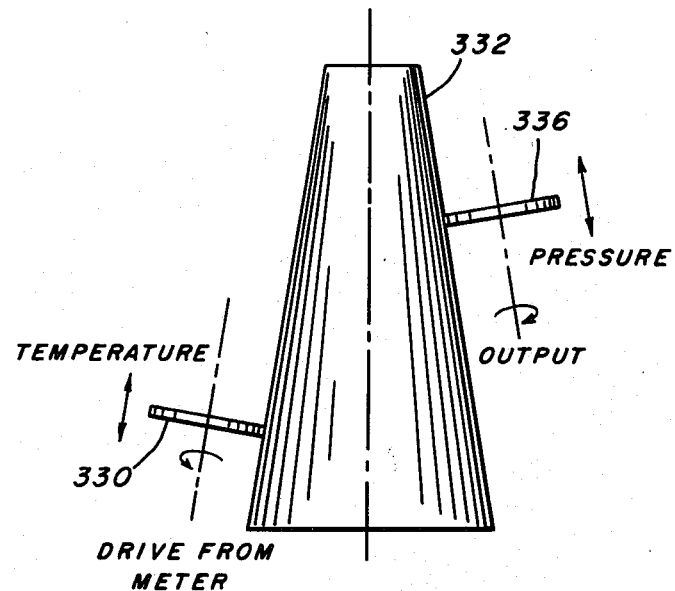
Figure 8:
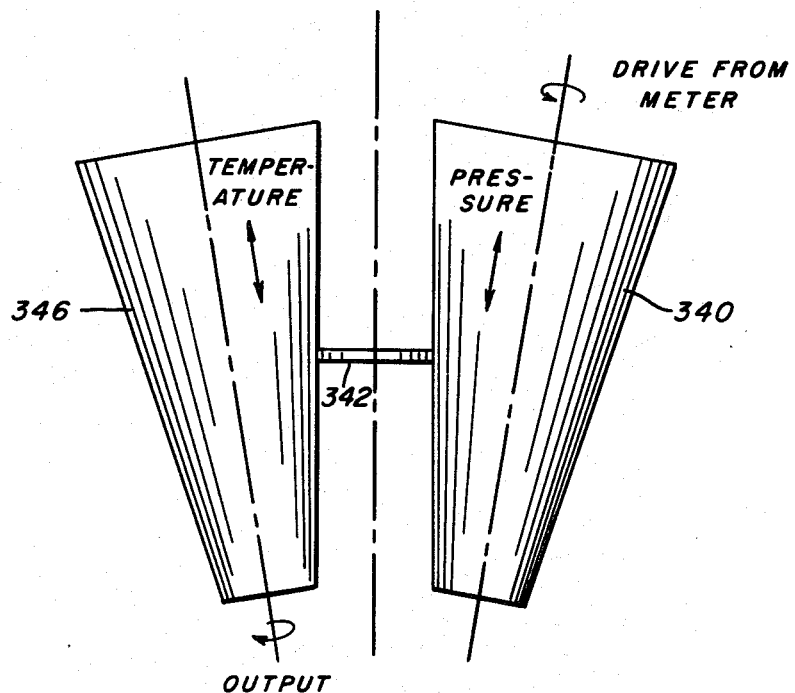

FIGS. 7 and 8 are schematic drawings of equivalent variable ratio transmissions which employ cones as the variable drive radius element. In FIG. 7 the drive from the meter would be applied to wheel 330 which in turn would drive cone 332 and which in turn would drive wheel 336 the output from the transmission being taken from wheel 336. By adjusting the axial position of wheel 330 in accordance with temperature variations the drive ratio between wheel 330 and cone 332 will be varied in accordance with such variations and the rotation of cone 332 will reflect fluid flow corrected for temperature. By varying the position of wheel 336 along its axis in accordance with variations in pressure the drive ratio between cone 332 and 336 will be varied in accordance with such variations and the rotation of wheel 336 will then represent the volume of fluid flow corrected for both pressure and temperature. In FIG. 8 as in the case of FIG. 6 two variable drive radius elements are employed. In this case the meter drive is applied to cone 340 which in turn drives wheel 342. By adjusting the position of cone 340 in accordance with pressure variations the drive ratio between cone 340 and wheel 342 is varied in accordance with such variations. Rotation of wheel 342 therefore reflects the fluid flow through the meter corrected for pressure only. By adjusting the position of cone 346 in direction parallel to the axis of rotation of wheel 342 the drive ratio between wheel 342 and cone 246 is varied in accordance with such variations and the rotation of cone 346 therefore reflects the volume of fluid flow through the meter corrected for both pressure and temperature.

In each of these embodiments, in accordance with the instant invention, the variable drive radius element would be coated with a material characterized by a low compression set and high resistance to abrasion such as polyurethane and the drive surfaces of the wheel with which the variable drive radius elements are in drive contact would have serrations which would be pressed into the polyurethane coating to produce a positive drive engagement therewith.

Finally, it should be apparent that the correction for temperature must be interposed by means of an arrangement of elements in which the drive is from the element having a fixed drive radius to the variable drive radius element rather than the reverse. On the other hand the correction for pressure must be interposed by means of an arrangement of elements in which the drive is from the variable drive radius element to the fixed drive radius element. The reason for this is fully explained in the aforementioned U.S. Pat. No. 3,895,532 and it is not felt necessary to repeat such explanation here.

I claim:

1. Apparatus for indicating the volume of fluid flow through a meter in a pipeline comprising a first drive element mounted for rotation about its axis, a second drive element mounted for rotation about its axis, one of said elements being a wheel having serrations formed on its periphery, the other being a variable drive radius element having a drive surface formed of a material characterized by low compression set and high resistance to abrasion, a third drive element mounted for rotation about its axis, one of said first and third drive elements being a variable drive radius element having a drive surface formed of a material characterized by compression set of no greater than 35% as measured by ASTM Test D395 Method B and high resistance to abrasion, the other being a wheel having serrations formed in its periphery, said first and second drive elements being in drive engagement, and said first and third drive elements being in drive engagement, means to adjust the point of engagement between said first and second drive elements to vary the drive ratio therebetween in accordance with one physical condition of the fluid flowing through said meter, means to adjust the point of engagement between said first and third drive element in accordance with variations in a second physical condition of said fluid, and means to drive connect said second drive element with the output of said meter.

2. The apparatus of claim 1 in which said material has a resistance to abrasion of not more than 55 as measured by ASTM Test C501.

3. The apparatus of claim 2 in which said material has a hardness of 50 to 55 on the Shore D scale.

* * * * *